(12) United States Patent
Humfeldt et al.

(10) Patent No.: US 8,302,747 B2
(45) Date of Patent: Nov. 6, 2012

(54) ENERGY ABSORBER FOR AIRCRAFT

(75) Inventors: Dirk Humfeldt, Hamburg (DE); Michael Harriehausen, Hamburg (DE); Jan Schröder, Hamburg (DE); Martin Sperber, Mönchengladbach (DE); Michael Demary, Meckenheim (DE)

(73) Assignee: Airbus Operations GmbH (DE)

( * ) Notice: Subject to any disclaimer, the term of this patent is extended or adjusted under 35 U.S.C. 154(b) by 642 days.

(21) Appl. No.: 12/223,831

(22) PCT Filed: Feb. 7, 2007

(86) PCT No.: PCT/EP2007/001033
§ 371 (c)(1), (2), (4) Date: Dec. 3, 2009

(87) PCT Pub. No.: WO2007/093311
PCT Pub. Date: Aug. 23, 2007

(65) Prior Publication Data
US 2010/0096230 A1    Apr. 22, 2010

Related U.S. Application Data

(60) Provisional application No. 60/773,762, filed on Feb. 15, 2006.

(30) Foreign Application Priority Data

Feb. 15, 2006  (DE) .................. 10 2006 007 029

(51) Int. Cl.
*F16F 7/12* (2006.01)
(52) U.S. Cl. ...................................... 188/371
(58) Field of Classification Search .................. 188/371, 188/374, 375, 376; 267/136, 140.11, 141; 244/110 R, 110 C, 110 F
See application file for complete search history.

(56) References Cited

U.S. PATENT DOCUMENTS

| | | | |
|---|---|---|---|
| 3,087,584 A | | 4/1963 | Jackson et al. |
| 3,504,567 A | * | 4/1970 | Ohashi et al. .................. 188/371 |
| 3,968,863 A | | 7/1976 | Reilly |
| 4,027,905 A | | 6/1977 | Shimogawa et al. |
| 5,597,055 A | * | 1/1997 | Han et al. ....................... 188/371 |
| 5,669,633 A | * | 9/1997 | Naff et al. ....................... 188/376 |
| 6,231,095 B1 | * | 5/2001 | Chou et al. ..................... 188/371 |
| 6,394,241 B1 | * | 5/2002 | Desjardins et al. ............ 188/376 |
| 6,409,239 B1 | * | 6/2002 | Tjoelker et al. ................ 188/376 |
| 2003/0111310 A1 | | 6/2003 | Renton et al. |
| 2004/0232685 A1 | | 11/2004 | Gatti et al. |

FOREIGN PATENT DOCUMENTS

| | | |
|---|---|---|
| DE | 1556322 | 12/1967 |
| DE | 2213323 | 9/1972 |
| DE | 4134545 | 11/1992 |
| DE | 69616946 T | 6/2002 |
| DE | 69715941 T | 6/2003 |
| EP | 0777064 | 6/1997 |
| EP | 0794350 | 9/1997 |
| GB | 1186332 | 4/1970 |
| GB | 1376786 | 12/1974 |
| JP | 04-62255 | 2/1992 |
| SU | 968535 | 10/1982 |
| WO | 2005002676 | 1/2005 |

\* cited by examiner

*Primary Examiner* — Thomas J Williams
(74) *Attorney, Agent, or Firm* — Lerner, David, Littenberg, Krumholz & Mentlik, LLP

(57) ABSTRACT

An energy absorber for aircraft includes one or more energy absorber elements and a housing, whereby the energy absorber elements can absorb crash impulses by plastic deformation within the housing.

15 Claims, 8 Drawing Sheets

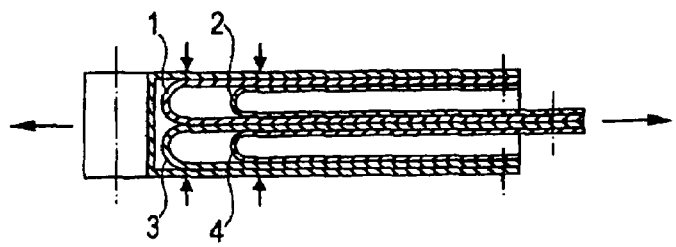
Fig. 5A
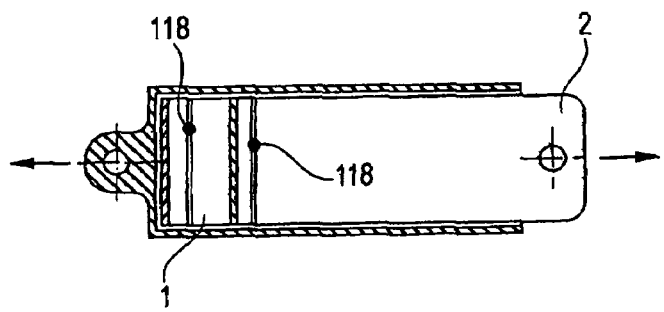
Fig. 5B
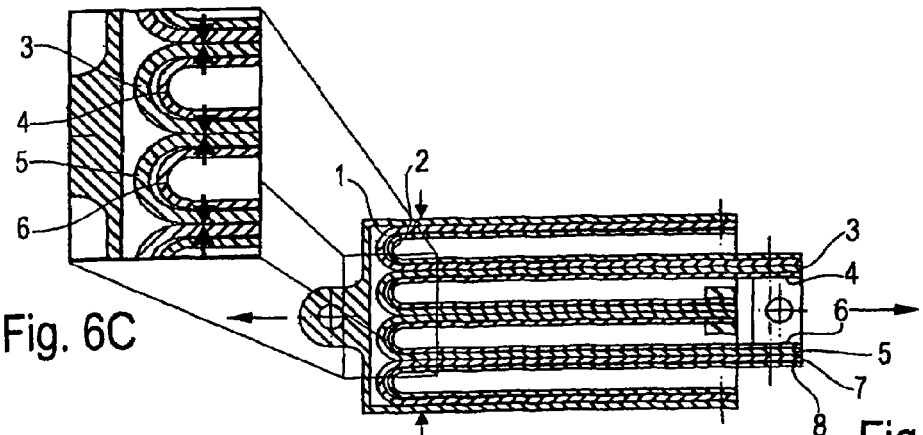
Fig. 6A
Fig. 6C
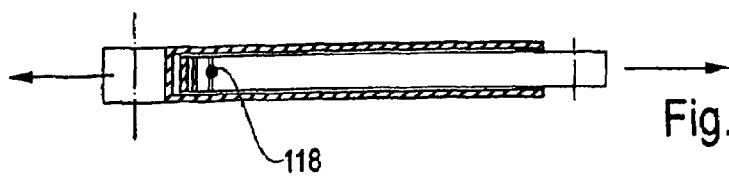
Fig. 6B

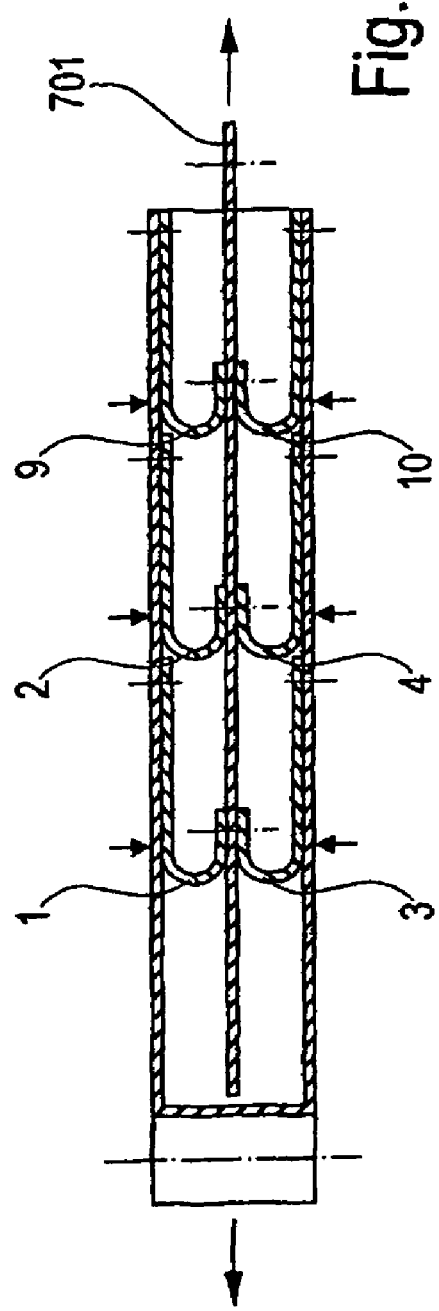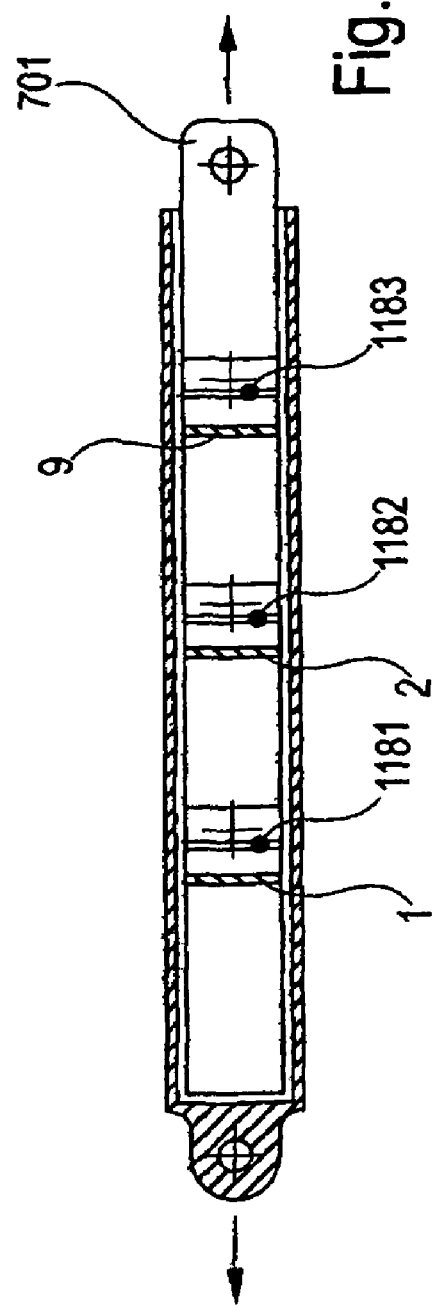

ENERGY ABSORBER FOR AIRCRAFT

RELATED APPLICATIONS

This application claims the benefit of German Patent Application No. 10 2006 007 029.1 filed Feb. 15, 2006, and of U.S. Provisional Application No. 60/773,762 filed Feb. 15, 2006, the disclosures of which are hereby incorporated herein by reference.

FIELD OF THE INVENTION

The present invention relates to energy absorbers for aircraft. In particular, the present invention relates to an energy absorber for an aircraft, the use of such an energy absorber in an aircraft, and a method for energy absorption in an aircraft.

In aircraft, holders or attachment elements for holding and attaching inboard devices, such as ceiling liners, overhead bins, or monuments, are used. Rigid attachment elements may, in particular in the event of intense accelerations, such as those that may occur in the event of severe turbulence or, for example, also with an emergency landing, transmit resulting acceleration forces directly from the primary structure of the aircraft over the holder to the attached inboard device. Likewise, all forces or accelerations acting on the inboard device are transferred directly via the holder or the holder system to the aircraft structure.

Known holders and the inboard devices attached thereto may statically placed on the basis of static load or maximum service loads. A breakdown of the holder, such as for example, by breaking or bursting out from the inboard device based on excessive acceleration forces may occur, which may lead to damage to the holder, the inboard device, or the primary structure of the aircraft and further, may endanger or injure the passengers or lead to impairment with a possible evacuation.

SUMMARY OF THE INVENTION

It is an object of the present invention to provide an energy absorber for aircraft, which provides a secure attachment of inboard devices or other devices of the aircraft, also under intense mechanical loads.

According to one embodiment of the present invention, an energy absorber for an aircraft is provided, the energy absorber including a first energy absorber element and a second energy absorber element, a third energy absorber element and a fourth energy absorber element, all four for absorption of an acceleration energy by plastic deformation, and a housing. The plastic deformation of the energy absorber elements takes place within the housing. The first energy absorber element is disposed adjacent to the second energy absorber element, and the third energy absorber element is disposed adjacent to the fourth energy absorber element, so that the respective, adjacent energy absorber elements are braced against one another, i.e. supported by one another, during a rolling motion.

By means of the energy absorber elements, which are integrated at least partially in the housing, the mechanical load on the inboard device, which is connected by the energy absorber with a primary structure of the aircraft, and which can be, for example, a luggage bin mounted over the passengers, may be limited. For example, the energy absorber may be designed for absorbing acceleration energy resulting from movement of the aircraft. By absorbing acceleration energies, the force transmissions from the primary structure of the aircraft to the inboard device or from the inboard device to the primary structure may be reduced. This may lead to an increased passive safety in the cabin. In addition, by using the energy absorber of the present invention with energy absorber elements, the construction of the inboard device may be designed in a material- or weight-savings manner, since the maximally occurring mechanical loads are reduced. This permits a weight-optimization of all components involved on the load curve (for example, inboard components, holder, and primary structure). In addition, with a statically overruled system, a uniform load distribution may be made possible, in particular with a structure deformed by load.

By the use of multiple energy absorber elements, which are arranged parallel to one another and lie flat on one another, the force levels may be increased. At the same time, the existing space may be better used and the differently positioned energy absorber elements (for example, in the form of sheets or plates) may affect a more favorable force distribution on the deck layers by the now existing two force lines.

Thus, with the energy absorber of the present invention, crash impulses, like those that may occur with an emergency landing, may be at least partially absorbed. The resulting force impact accordingly may not be transferred completely to the inboard device, rather damped additionally or absorbed partially to a defined force level, so that malfunction may be prevented.

By the principle of plastic deformation, it may further be possible to absorb multiple crash impulses, and in the forward as well as in the reverse direction. In other words, the energy absorber may work in two directions (specifically, are extracted from the housing and displaced into the housing) and thereby absorb impacts in different directions.

The outwardly acting forces may be reduced, such that (with suitable construction) a separate housing can be eliminated and can be integrated in the geometry to be mounted (for example, honeycomb plates with a hatrack).

There may be no surfaces subjected to friction.

According to a further exemplary embodiment of the present invention, the energy absorber further includes a fifth energy absorber element and a sixth energy absorber element, which are arranged adjacent to one another, so that they brace against one another during rolling motion.

Thus, a plurality of absorber pairs can be used which roll against one another, whereby the force level may be further increased and a flatter construction of the energy absorber may be possible.

According to a further exemplary embodiment of the present invention, a seventh energy absorber element and an eighth energy absorber element are provided, whereby the seventh energy absorber element is inlaid in the first energy absorber element, and whereby the eighth energy absorber element is inlaid in the second energy absorber element.

In this manner, it may be ensured that the absorbed force is distributed better on the housing.

According to a further embodiment of the present invention, the housing includes a first cover plate or cover sheet, a second cover plate or cover sheet, and a fixed support for the second energy absorber element and the first energy absorber element.

According to a further embodiment of the present invention, the first energy absorber element has a longitudinal slot or slit, whereby the housing further has an intermediate wall, which is mounted in the area of the slit.

By slitting the sheet and the division of the housing by the intermediate walls into multiple chambers made possible thereby, the maximum forces on the deck layers may be reduced substantially.

According to a further embodiment of the present invention, the energy absorber further includes a first attachment area and a second attachment area, whereby the first attachment area is designed for attachment of the energy absorber to the primary structure and whereby the second attachment area is designed for attachment of the energy absorber to the inboard device.

The attachment areas may make possible, for example, a simple assembly. In this regard, the energy absorber first may be fixedly mounted to a hull- or ceiling surface or to a support element of the primary structure. Next, then, an inboard device element may be connected permanently at the second attachment area with the energy absorber.

According to a further exemplary embodiment of the present invention, the attachment of the energy absorber to the primary structure or to the inboard device takes place by means of a force- or positive-locking connection.

Therefore, an energy absorber may be provided, for example, which may be mounted simply. The first attachment region, for example, additionally may have a profile, for example, in the form of a claw element, which is inserted onto a rectangular section of a support. In this regard, the claw element may be designed, for example, such that the energy absorber is held to the support with this insertion so that its fixed weight is held. For final attachment of the energy absorber, the energy absorber then may be fixed by means of screws, rivets or self-locking pins or similar means to the support.

According to a further exemplary embodiment of the present invention, the energy absorber further has an adjustment element. The adjustment element may change the bending radius of the energy absorber element and therewith, the lever arm. In this manner, a change of the force level may be provided (for example, a variable constant load level or a progressive or declining performance may thus be adjustable).

In this manner, the force progression may be freely adjusted by continuous change of the cover sheet distance.

In addition, the force-path progression may be adapted individually by a contour adaptation of the cover sheet. In addition, the energy absorber itself can be structured or contoured, in order to individually adjust a further adaptation of the force-path progression.

For example, the cover sheet can have a bulge or hump, so that the energy absorber element may be forced to an additional bending, which may affect likewise the force level.

According to a further exemplary embodiment of the present invention, the energy absorber has an energy absorption direction, whereby not until exceeding of a minimal force (force limiter), which acts in the direction of the energy absorption direction, an energy absorption occurs through the energy absorber.

The interior device (e.g. a facility or compartment or the like) can be supported substantially fixedly with correspondingly minimal load, so that it may be suitable for normal on-board operation. With increased load, such as through an intense impact of force, a damping is established, in which for example, the energy absorber is pulled in the absorption direction from the housing (or is pushed into the housing). In this manner, correspondingly intense force impacts may effectively be absorbed.

According to a further exemplary embodiment of the present invention, the use of an energy absorber in an aircraft is provided.

According to a further exemplary embodiment of the present invention, a method for energy absorption in an aircraft is provided, including a pulling out of a first energy absorber element, a second energy absorber element, a third energy absorber element, and a fourth energy absorber element from a housing, and an absorption of an acceleration energy by plastic deformation of the energy absorber elements within the housing during the pulling out, whereby the first energy absorber element is arranged adjacent to the second energy absorber element, and whereby the third energy absorber element is arranged adjacent to the fourth energy absorber element, so that respective, adjacent energy absorber elements are braced against one another during rolling motion.

Further embodiments of the invention are provided in the dependent claims.

Next, the invention will be described in greater detail with regard to exemplary embodiments in reference to the drawings.

SHORT DESCRIPTION OF THE FIGURES

FIG. 5A shows a schematic cross-sectional representation of an energy absorber.

FIG. 5B shows a further schematic cross-sectional representation of the energy absorber of FIG. 5A.

FIG. 6A shows an energy absorber in a schematic cross-sectional representation according to an exemplary embodiment of the present invention.

FIG. 6B shows a further schematic cross-sectional representation of the energy absorber of FIG. 6A.

FIG. 6C shows a detail enlargement of a region of the energy absorber of FIG. 6A.

FIG. 7A shows a schematic cross-sectional representation of an energy absorber.

FIG. 7B shows a further schematic cross-sectional representation of the energy absorber of FIG. 7A.

In the following description of the figures, the same reference numerals are used for the same or similar elements.

The representations in the figures are schematic and not to scale.

DETAILED DESCRIPTION OF EXEMPLARY EMBODIMENTS

Figure 1A:
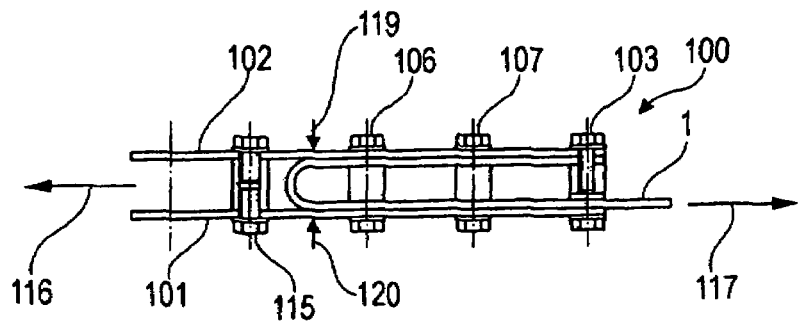
FIG. 1A shows a schematic cross-sectional representation of the energy absorber according to one exemplary embodiment of the present invention.

FIG. 1A shows a schematic cross-sectional representation of an energy absorber according to an exemplary embodiment of the present invention. The energy absorber 100 has a lower housing region 101 and an upper housing region 102, between which the energy absorber element is mounted.

The energy absorber 100, in which this energy absorber elements 1 are installed, is subdivided basically into so-called single deckers with a sheet or plate (for absorption) or with multiple sheets or plates placed in one another and so-called multiple deckers with two or more sheets or plates running opposite to one another (which can comprise respectively again multiple sheets or plates placed in one another).

Thus, multiple sheets may be nested in one another, in order to achieve for example an optimization of the cover layer load, better volume use or increased force level.

In addition, the energy absorber 100 includes a fixed support 103 for the energy absorber element 1 and force impact points 105-112, 115.

Figure 1B:
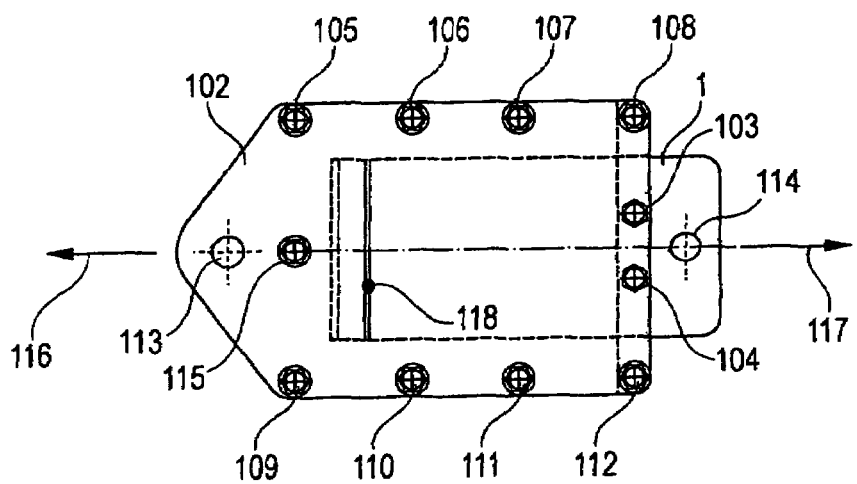
FIG. 1B shows a schematic representation of the energy absorber of FIG. 1A in plan view.

FIG. 1B shows the energy absorber of FIG. 1A in a representation rotated at 90°. The upper housing part or double-decker sheet 102 has a bore 113 for attachment, for example, to the primary structure of the aircraft. The energy absorber element 1 has a bore 114 for attachment, for example, to an inboard device part of the aircraft. If a force acts now on the housing in the direction of the arrow 116 and a force acts on the absorber element 1 in the opposite direction 117, then the absorber element is pulled out from the housing by plastic deformation upon exceeding a known minimal force. Thus, energy is absorbed.

The absorption functions also in the reverse direction, as specifically the energy absorber element 1 is pressed into the housing. The first impact points 105 to 112 and 115 serve on the one hand for connection of the cover plates 101, 102 and for distribution of the occurring forces (symbolized by force line 118 and arrows 119, 120).

The structure shown in FIG. 1 represents the basic form of the single decker. Here, the energy absorber element 1 is braced against the cover layers 101, 102 and is transformed upon reaching the trigger force.

Figure 2A:
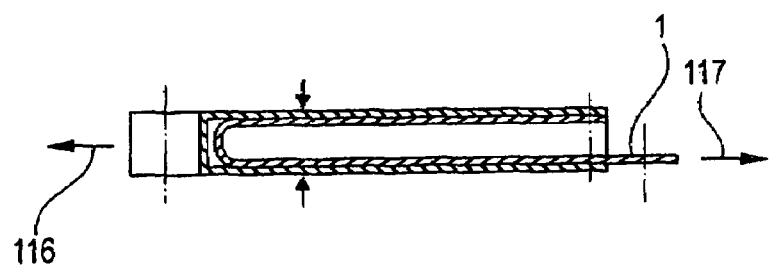
FIG. 2A shows a schematic cross-sectional representation of an energy absorber.
Figure 2B:
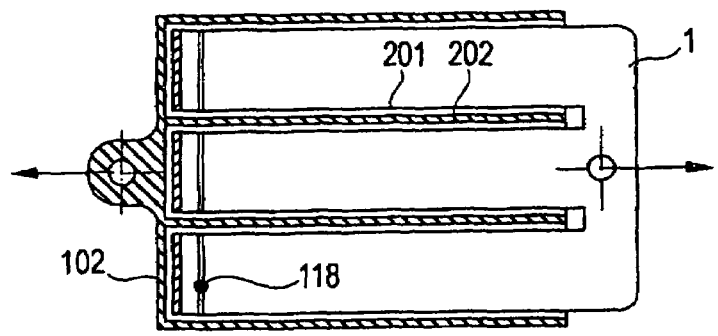
FIG. 2B shows a further schematic cross-sectional representation of the energy absorber of FIG. 2A.

FIGS. 2A, 2B shows cross-sectional representations of an energy absorber according to a further exemplary embodiment of the present invention. This structure is principally designed like the structure in FIG. 1. By means of the slots of the sheet 1 and the subdivision of the housing 102, 101 made possible in this manner by intermediate walls 202 into multiple chambers, the forces may be greatly reduced or uniformly distributed. Reference numeral 201 represents a slot in the sheet, in which an intermediate wall 202 runs.

Figure 3A:
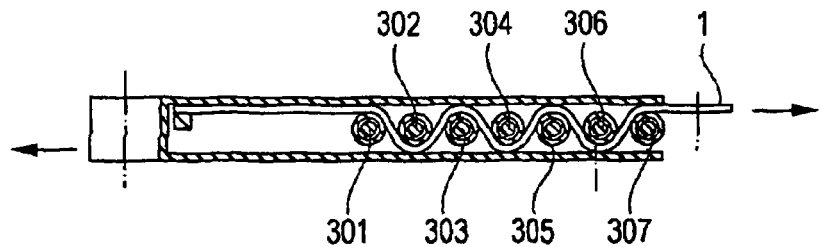
FIG. 3A shows a schematic cross-sectional representation of an energy absorber.
Figure 3B:
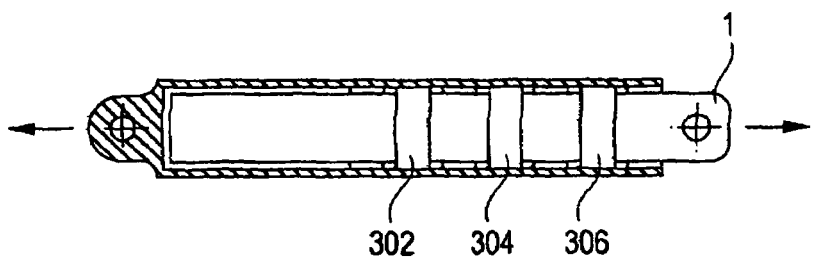
FIG. 3B shows a further schematic cross-sectional representation of the energy absorber of FIG. 3A.

FIGS. 3A, 3B show a further energy absorber according to a further exemplary embodiment of the present invention in two cross-sectional representations. This structure can be viewed as an independent deformation principle. Since here, however, preferably only one energy absorber element 1 is deformed, this structure is attributed likewise to the single-decker. The sheet is passed multiple times around rollers 301, 302, 303, 304, 305, 306, 307. The rollers should be designed to be rotatable, in order to hold the frictional effect at a minimum.

Figure 4A:
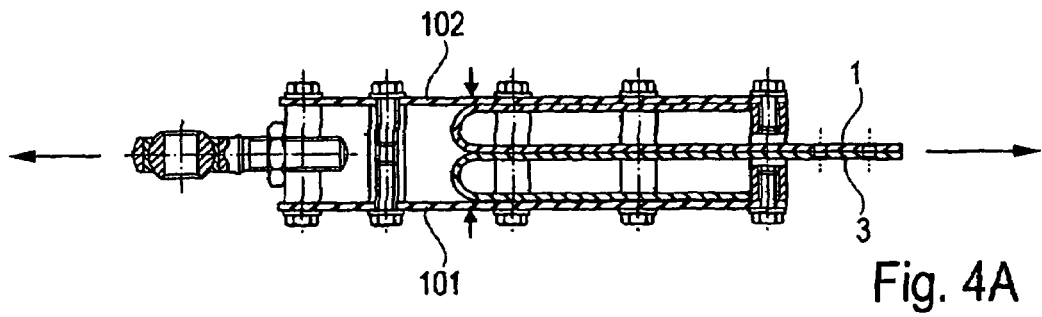
FIG. 4A shows a schematic cross-sectional representation of a further energy absorber.
Figure 4B:
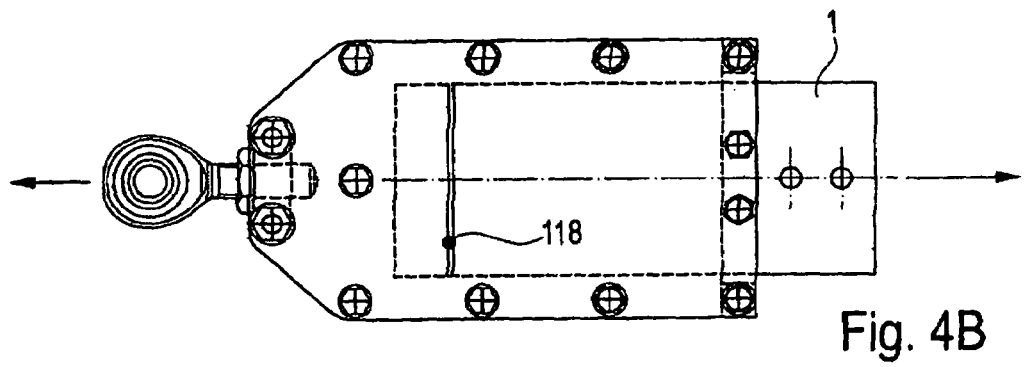
FIG. 4B shows a further schematic cross-sectional representation of the energy absorber of FIG. 4A.

FIGS. 4A, 4B show an energy absorber according to a further exemplary embodiment of the present invention, which belongs to the structure "double deck".

Here, the first energy absorber element 1 is braced on one side against the cover plate 102. A second energy absorber element 3 is provided, which is braced on the other side against the lower cover plate 101. The energy absorber elements 1, 3 are deformed upon reaching the tripper force and roll against one another.

FIGS. 5A, 5B shows an energy absorber according to a further exemplary embodiment of the present invention. This structure is designed principally like the structure of FIG. 4. By the placement of two or more sheets 1, 2 or 3, 4, the force level may be increased. For example, larger loads can therefore be absorbed. At the same time, one uses the space better and the differently positioned, sheets affect a favorable force distribution on the cover plates 101, 102 through the now existing two force lines 118.

FIGS. 6A, 6B, 6C shows a further embodiment of the energy absorber. Here, respectively, two (or more) sheets are placed in one another (1, 2 or 3, 4 or 5, 6 or 7, 8). In addition, the different groups of inlaid sheets are placed respectively over one another. The sheet pair 1, 2 is braced with a rolling motion against the sheet pair 3, 4 and the sheet pair 5, 6, is braced with a rolling motion against the sheet pair 7, 8.

The structural space here may be used very favorably. The multiple sheets lying over one another acts by their arrangement itself like cover plates and may reduce therefore the forces acting on the cover layers 101, 102.

In addition, through the adjacent placement of such sheets, the thickness of the energy absorber 100 (that is, the spacing of both cover plates 101, 102) with constant force progression may be reduced. This may enable an integration of the energy absorber in a sandwich plate of the aircraft cabin structure, for example, which may result in turn in reduction of the housing.

FIGS. 7A, 7B show an energy absorber according to a further exemplary embodiment of the present invention. This structure is designated by a slim design. Here, the individual energy absorber elements 1, 2, 3, 4, 9, 10 are connected to one another via a central tension rod 701. The differently positioned sheets may affect a favorable force distribution on the cover plates 101, 102 through the now existing three force lines 1181, 1182, 1183.

FIGS. 8A through 9D show an energy absorber with an adjustment element according to a further exemplary embodiment of the present invention. The force progression may be adjusted freely by continuous change of the cover plate distance. This adjustment element system may be used for the single cover principle as well as for the double or multiple cover principle.

The adjustment element system includes a first adjustment element 801, a second adjustment element 802, and a cover plate 803, which can be displaced by actuation of both adjustment elements 801, 802.

By actuation of the adjustment elements 801, 802, the cover plate 803 can be displaced, such that the energy absorber element 1 is squeezed together more or less intensely.

Figure 8A:
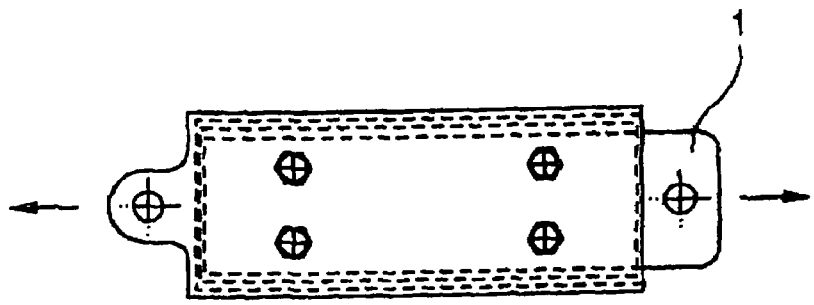
FIG. 8A shows a schematic cross-sectional representation of an energy absorber with an adjustment element.
Figure 8B:
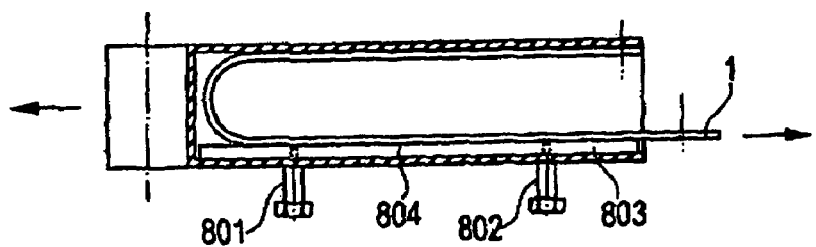
FIG. 8B shows a further schematic cross-sectional representation of the energy absorber of FIG. 8A.
Figure 8C:
FIG. 8C shows an exemplary force-path-progression of the energy absorber according to the configuration of FIGS. 8A, 8B.

In the configuration shown in FIGS. 8A, 8B, the uniform, substantially constant force-path-progression of FIG. 8C may be provided.

Figure 8D:
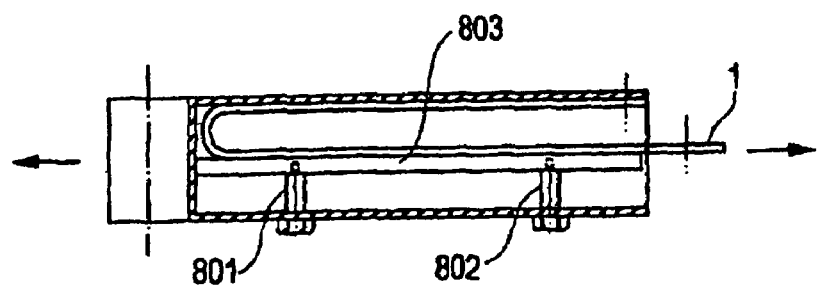
FIG. 8D shows the energy absorber of FIGS. 8A, 8B with an actuated adjustment element.
Figure 8E:
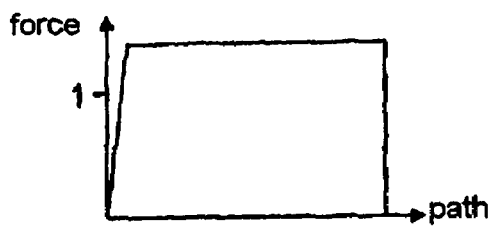
FIG. 8E shows a corresponding force-path-progression of the energy absorber according to the configuration of FIG. 8D.

In the position shown in FIG. 8D (here the adjustment elements 801, 802 are screwed in more strongly, so that the cover plate 803 presses together the energy absorber element 1 more strongly), the force-path-progression shown in FIG. 8D may be provided (at higher level than in FIG. 8C).

Figure 9A:
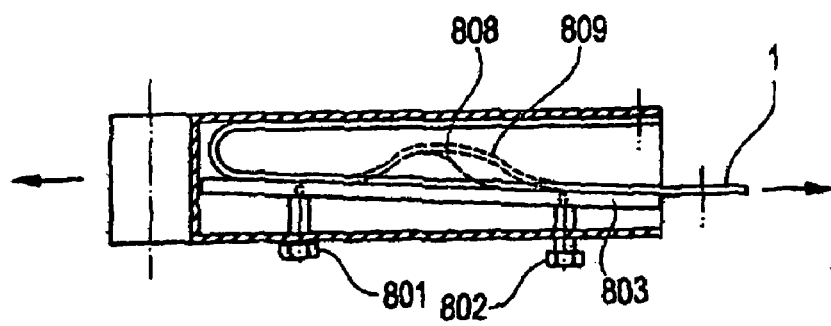
FIG. 9A shows an energy absorber with an adjustment element.
Figure 9B:
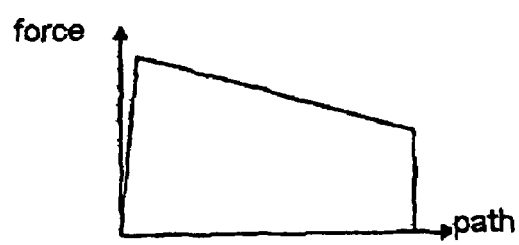
FIG. 9B shows a corresponding force-path-progression of the energy absorber according to the configuration of FIG. 9A.

In the position shown in FIG. 9A, in which the cover plate 803 is positioned at an incline, the force progression shown in FIG. 9B may be provided. Here, after expenditure of a minimal force, the force progression is not constant, rather decreases upon pulling out of the strip 1. On the contrary, the force progression increases upon pushing in of the strip.

The cover plate 803 may also have a different form, for example, a hump or bulge 808, which leads to bending of the sheet 1 still further in the region 809, thereby changing the force-path-progression accordingly.

Figure 9C:
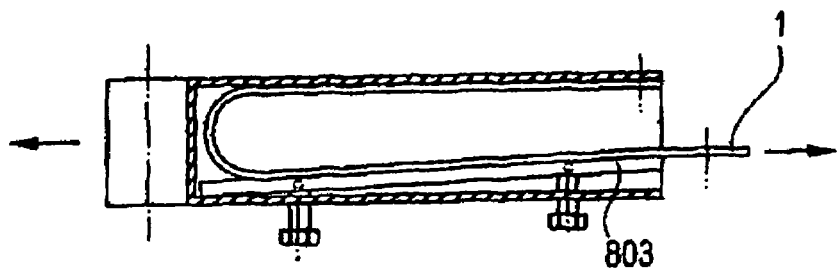
FIG. 9C shows the energy absorber of FIG. 9A with a different actuated adjustment element.
Figure 9D:
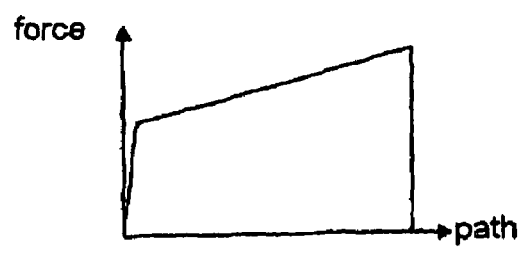
FIG. 9D shows the corresponding force-path-progression of the energy absorber according to the configuration of FIG. 9C.

In the configuration shown in FIG. 9C, a reverse force progression (see FIG. 9D) is provided, in which upon pulling out of the sheet 1, the force expended therefore increases (and vice versa).

FIGS. 10A through 11D show a double decker system with adjustment elements 801, 802, 805, 806 and cover sheets 803, 807.

Figure 10A:
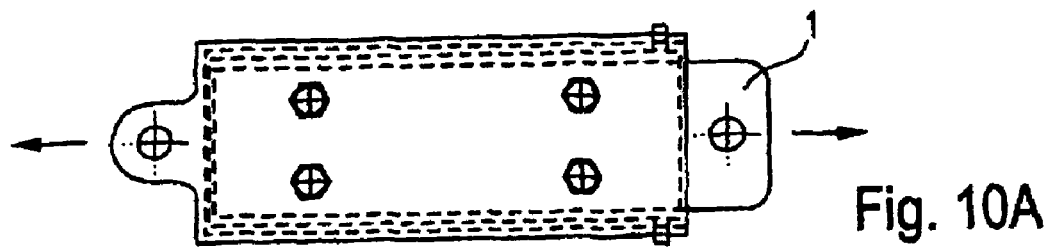
FIG. 10A shows an energy absorber with an adjustment element.
Figure 10B:
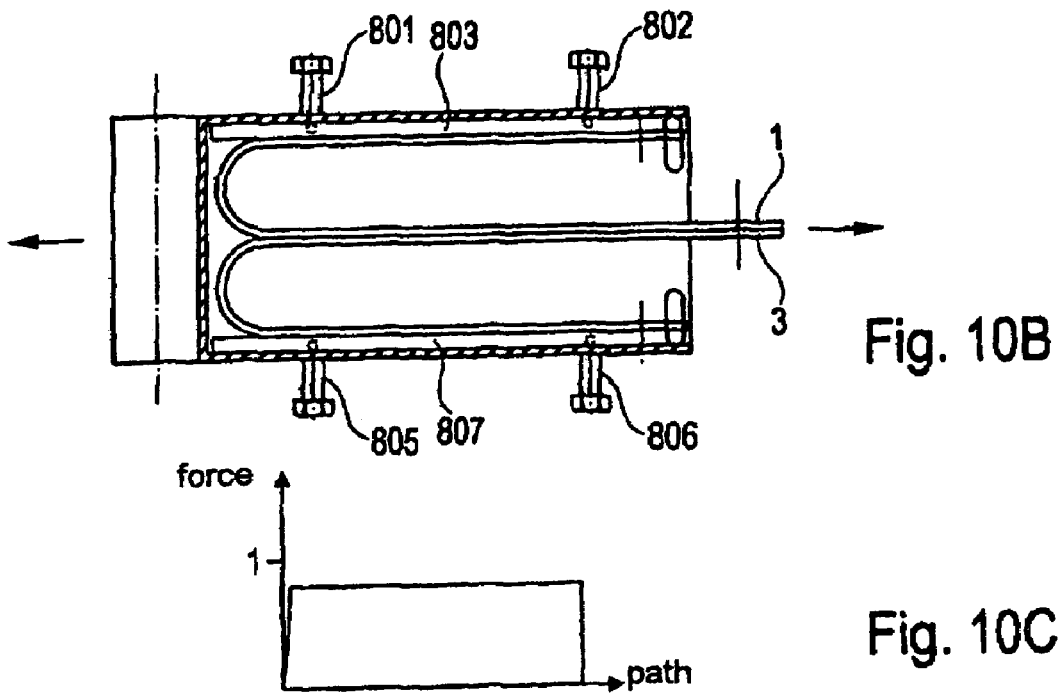
FIG. 10B shows the energy absorber of FIG. 10A in a further cross-sectional representation.
Figure 10C:
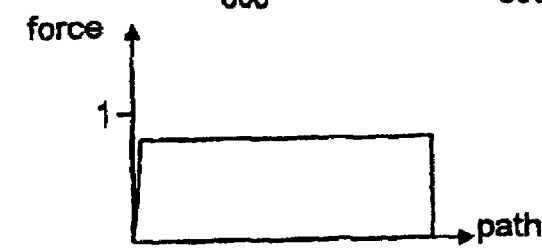
FIG. 10C shows the corresponding force-path-progression of the energy absorber according to the configuration of FIGS. 10A, 10B.
Figure 10D:
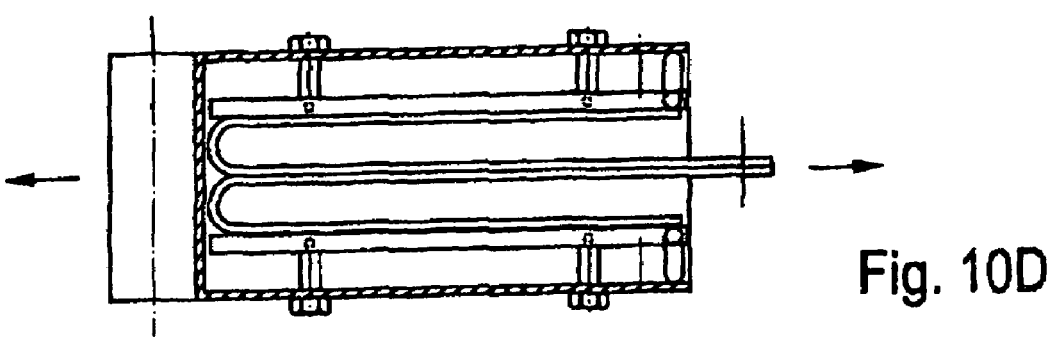
FIG. 10D shows the energy absorber of FIG. 10A with actuated adjustment elements.

The force progression resulting from the configuration of FIGS. 10A, 10B is shown in FIG. 10C. The force runs constantly here upon pulling out or pushing in of the sheets 1, 3.

Figure 10E:
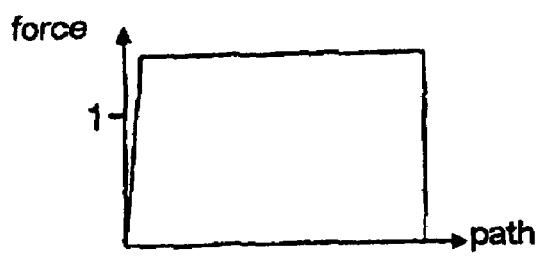
FIG. 10E shows the corresponding force-path-progression of the energy absorber according to the configuration of FIG. 10D.

If the adjustment elements 801, 802, 805, 806 are screwed in (see FIG. 10D), an increased force progression is provided (see FIG. 10E).

Figure 11A:
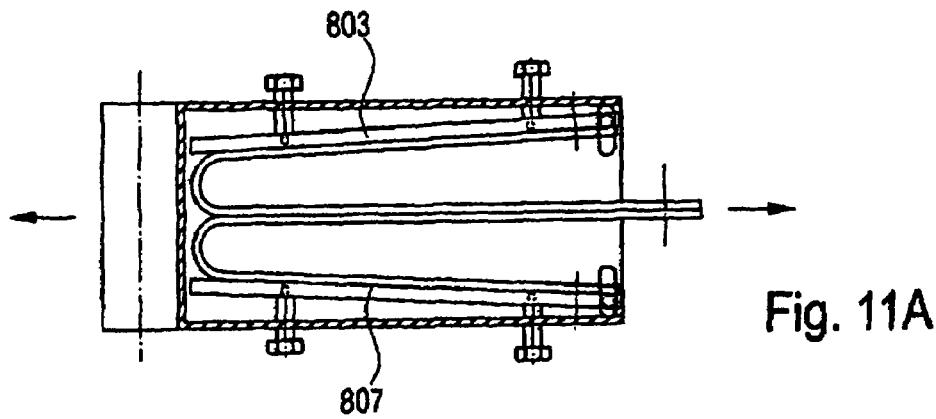
FIG. 11A shows an energy absorber with actuated adjustment elements.
Figure 11B:
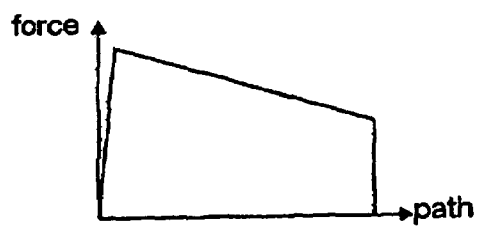
FIG. 11B shows the corresponding force-path-progression of the energy absorber according to the configuration of FIG. 11A.

If the adjustment elements are screwed in strongly in a different manner, as shown in FIG. 11A, a force progression that decreases upon pulling out is provided (see FIG. 11B).

Figure 11C:
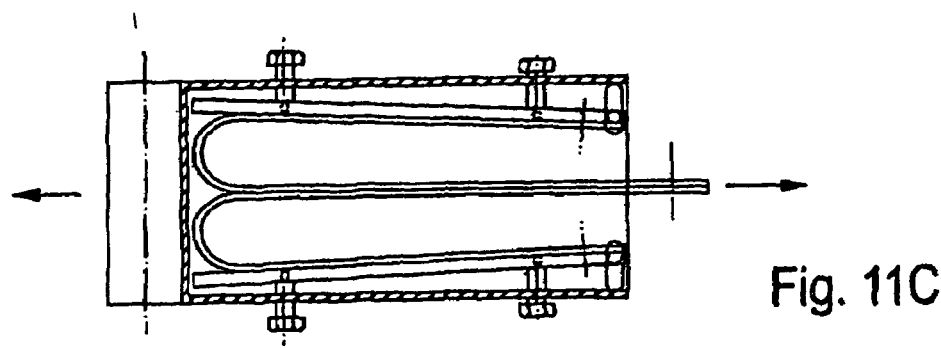
FIG. 11C shows a further energy absorber with actuated adjustment elements.
Figure 11D:
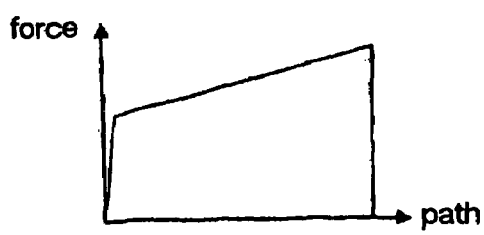
FIG. 11D shows the force-path-progression of the energy absorber according to the configuration of FIG. 11C.

If in contrast the adjustment elements are screwed in counter to the configuration of FIG. 11A (see FIG. 11C), an increased force progression is provided upon pulling out of the strips 1, 2 (see FIG. 11D).

The adjustment elements may be positioned also via hydraulic tappet rods, eccentric disks or electric adjustment drives instead of by screws (see FIGS. 11A and 11C).

Thus, the force level of the absorption may be adjusted also very quickly and/or by automation to the individual situation.

Naturally, also the use of other materials may be possible, for example flexible, deformable plastics or other flexible, deformable materials/material mixtures.

The shown energy absorber may also be used as an energy absorber in so-called tie-rods. Further applications are, for example:

Energy absorber in tie rods of hatrack chains. The particular effect is the transfer of forces of the released holder onto the hatrack arranged in front of it and therewith a potential of redundancy of these retaining concepts. Essentially, these principles are useable where a permanent, positive force-fit connection (defined kinematically) is required.

Energy absorber in undercarriages.

Energy absorber with belt systems.

Energy absorber in rudder linkage for large landing flaps and rudders.

Energy absorber for seats.

Energy absorber with the securing of freight.

Integration of energy absorbers in the attachment points of monuments of the cabin.

Energy absorber for APUs, in particular for attachment of the APU ("Auxiliary Power Unit").

Energy absorber for separating walls or aircraft arrester nets.

By changing the geometry of the absorber elements, the bending radius and the material properties, the force levels may be varied. In addition, the force level may be adjustable by changing spacing of the cover sheets. A permanent frictional connection exists. The system is impervious to environmental conditions. In addition, the system is insensitive to diagonal pull (that is, for example, diagonal with reference to the arrow in FIG. 9A), which can occur for example with a crash by deformation of the primary structure. Here, a relative displacement of elements/components can occur, which could have as a result a deviation in the pullout direction.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. An energy absorber for an aircraft, the energy absorber comprising:
    a first energy absorber element, a second energy absorber element, a third energy absorber element, and a fourth energy absorber element, wherein all four energy absorber elements are adapted for absorption of an acceleration energy by plastic deformation; and
    a housing,
    wherein the energy absorber elements are configured to undergo plastic deformation within the housing, and
    wherein the first energy absorber element is disposed adjacent to the second energy absorber element, and wherein the third energy absorber element is disposed adjacent to the fourth energy absorber element such that the respective, adjacent energy absorber elements are braced against one another during rolling motion,
    wherein the first energy absorber element has a longitudinal slit, and
    wherein the housing further has an intermediate wall, which is mounted in the region of the slit.

2. The energy absorber of claim 1, further comprising:
    a fifth energy absorber element and a sixth energy absorber element, which are arranged adjacent to one another so that they are braced against one another with rolling motion.

3. The energy absorber of claim 1, further comprising:
    a fifth energy absorber element and a sixth energy absorber element;

wherein the fifth energy absorber element is inlaid in the first energy absorber element; and wherein the sixth energy absorber element is inlaid in the second energy absorber element.

4. The energy absorber of claim 1, wherein the housing includes a first cover plate, a second cover plate and a fixed support for the second energy absorber element and the first energy absorber element.

5. The energy absorber of claim 1, further comprising:

a first attachment region; and a second attachment region;

wherein the first attachment region is configured for attachment of the energy absorber to a primary structure; and wherein the second attachment region is configured for attachment of the energy absorber to an interior device.

6. The energy absorber of claim 1 further comprising:

one or more of screws, rivets, or self-locking locking pins for attaching the energy absorber to a primary structure or to an interior device.

7. The energy absorber of claim 1, wherein the energy absorber has an energy absorption direction; and wherein upon exceeding of a minimal force, which acts in the direction of the energy absorption direction, an energy absorption occurs through the energy absorber.

8. A method for energy absorption in an aircraft, comprising:

pulling-out of a first energy absorber element, a second energy absorber element, a third energy absorber element and a fourth energy absorber element from a housing;

absorbing an acceleration energy by plastic deformation of the first energy absorber element and of the second energy absorber element within the housing during the pulling-out; and continuously adjusting a bending radius of at least one of the energy absorber elements via an adjustable element, wherein the first energy absorber element is disposed adjacent to the second energy absorber element, and wherein the third energy absorber element is disposed adjacent to the fourth energy absorber element, so that the respective, adjacent energy absorber elements are braced against one another during rolling motion.

9. An energy absorber for an aircraft, the energy absorber comprising:

a first energy absorber element, a second energy absorber element, a third energy absorber element, and a fourth energy absorber element, wherein all four energy absorber elements are adapted for absorption of an acceleration energy by plastic deformation;

an adjustment element; and a housing, wherein the energy absorber elements are configured to undergo plastic deformation within the housing, wherein the first energy absorber element is disposed adjacent to the second energy absorber element, and wherein the third energy absorber element is disposed adjacent to the fourth energy absorber element such that the respective, adjacent energy absorber elements are braced against one another during rolling motion, and wherein via the adjustment element a bending radius of the energy absorber element is continuously adjustable.

10. The energy absorber of claim 9, further comprising:

a fifth energy absorber element and a sixth energy absorber element arranged adjacent to one another so that they are braced against one another with rolling motion.

11. The energy absorber of claim 9, further comprising:

a fifth absorber element and a sixth energy absorber element;

wherein the fifth energy absorber element is inlaid in the first energy absorber element; and wherein the sixth energy absorber element is inlaid in the second energy absorber element.

12. The energy absorber of claim 9, wherein the housing includes a first cover plate, a second cover plate and a fixed support for the second energy absorber element and the first energy absorber element.

13. The energy absorber of claim 9, further comprising:

a first attachment region; and a second attachment region;

wherein the first attachment region is configured for attachment of the energy absorber to a primary structure; and wherein the second attachment region is configured for attachment of the energy absorber to an interior device.

14. The energy absorber of claim 9 further comprising:

one or more screws, rivets, or self-locking pins for attaching the energy absorber to a primary structure or to an interior device.

15. The energy absorber of claim 9, wherein the energy absorber has an energy absorption direction; and wherein upon exceeding of a minimal force, which acts in the direction of the energy absorption direction, an energy absorption occurs through the energy absorber.

* * * * *